United States Patent [19]
Williams et al.

[11] Patent Number: 6,157,411
[45] Date of Patent: *Dec. 5, 2000

[54] METHOD AND APPARATUS FOR COMPILING A REPOSITORY OF ENTERTAINMENT SYSTEM DATA FROM MULTIPLE SOURCES

[75] Inventors: Christopher D. Williams, Soquel; Jean M. Goldschmidt Iki, San Jose; Kenneth Alan Moore, Fremont, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,637

[22] Filed: Jun. 12, 1997

Related U.S. Application Data

[60] Provisional application No. 60/019,738, Jun. 14, 1996.

[51] Int. Cl.⁷ .................................................. H04N 7/10
[52] U.S. Cl. .............................. 348/552; 348/10; 348/11; 348/12; 348/553; 348/906
[58] Field of Search .................... 348/10, 11, 552, 348/465, 461, 6, 7, 8, 9, 12, 13, 906, 553; 455/6.2, 6.3; H04N 7/10

[56] References Cited

U.S. PATENT DOCUMENTS

| | | | |
|---|---|---|---|
| 4,706,121 | 11/1987 | Young | 348/27 |
| 4,751,578 | 6/1988 | Reiter et al. | 348/564 |
| 5,038,211 | 8/1991 | Halleneck | 348/906 |
| 5,444,499 | 8/1995 | Saitoh | 348/734 |
| 5,481,294 | 1/1996 | Thomas et al. | 348/1 |
| 5,534,911 | 7/1996 | Levitan | 348/1 |
| 5,550,576 | 8/1996 | Klosterman | 348/6 |
| 5,553,311 | 9/1996 | McLaughlin et al. | 348/10 |
| 5,564,043 | 10/1996 | Siefert | 395/600 |
| 5,564,088 | 10/1996 | Saitoh | 455/186.1 |
| 5,574,964 | 11/1996 | Hamlin | 348/12 |
| 5,579,055 | 11/1996 | Hamilton et al. | 348/476 |
| 5,583,560 | 12/1996 | Florin et al. | 348/7 |
| 5,585,838 | 12/1996 | Lawler et al. | 348/13 |
| 5,589,892 | 12/1996 | Knee et al. | 348/731 |
| 5,619,249 | 4/1997 | Billock et al. | 348/12 |
| 5,629,733 | 5/1997 | Youman et al. | 348/7 |
| 5,635,979 | 6/1997 | Kostreski et al. | 348/10 |
| 5,640,453 | 6/1997 | Schuchman et al. | 348/10 |
| 5,666,293 | 9/1997 | Metz et al. | 348/10 |
| 5,675,390 | 10/1997 | Schindler et al. | 348/552 |
| 5,682,511 | 10/1997 | Sposato et al. | 395/353 |
| 5,689,663 | 11/1997 | Williams | 395/327 |
| 5,745,710 | 4/1998 | Clanton, III et al. | 395/327 |
| 5,768,539 | 6/1998 | Metz et al. | 348/10 |
| 5,778,181 | 7/1998 | Hidary et al. | 395/200.48 |
| 5,781,734 | 7/1998 | Ohno et al. | 348/12 |
| 5,784,095 | 7/1998 | Robbins et al. | 348/906 |
| 5,802,284 | 9/1998 | Karlton et al. | 348/10 |
| 5,805,235 | 9/1998 | Bedard | 348/569 |
| 5,809,204 | 9/1998 | Young et al. | 386/83 |

OTHER PUBLICATIONS

PCT International Application No. PCT/US93/02861, International Publication No. WO 93/19427, International Publication Date of Sep. 30, 1993.

International Search Report, PCT/US 93/02861, filed Mar. 24, 1993, WO 93/19427.

*Primary Examiner*—John K. Peng
*Assistant Examiner*—Linus M. Lo
*Attorney, Agent, or Firm*—Blakely, Sokoloff, Taylor & Zafman LLP

[57] ABSTRACT

A method and apparatus for compiling a repository of entertainment system data receives entertainment system data, including television program data and software application data, from at least a subset of a plurality of sources. The entertainment system data is then stored in a unitary format for subsequent access by a user.

22 Claims, 5 Drawing Sheets

METHOD AND APPARATUS FOR COMPILING A REPOSITORY OF ENTERTAINMENT SYSTEM DATA FROM MULTIPLE SOURCES

RELATED APPLICATIONS

This non-provisional application claims priority to Provisional Application No. 60/019,738 to Goldschmidt et al., for "Method for Compiling a Data Repository of Entertainment Information Provided from any of Multiple Sources in a Source-Specific Format" filed on Jun. 14, 1996, which is assigned to the assignee of the present application.

BACKGROUND OF THE INVENTION

FIELD OF THE INVENTION

The present invention pertains to the field of entertainment systems. More particularly, this invention relates to a method and apparatus for compiling a repository of entertainment system data and simplifying entertainment system programming selection.

BACKGROUND

A current trend in the electronics and computer industry is the convergence of computer systems and more traditional entertainment system components. As this convergence continues into the future, more and more components will be combined together, resulting in an increase in the programming selections available to users.

However, one problem which will be faced by users as these "convergent systems" grow is the "user-friendliness" of the convergent systems. As the number of components in the system increases and the number of programming selections available to the user increases, the amount of information and control steps which the user is required to keep track of and perform in order to select and use various programming selections likewise increases. Therefore, it would be beneficial to provide a way to simplify user selection of programming information.

Typical current mechanisms for storing programming information to users are component-specific. For example, on-screen television guides are available, however, these typically only store and display television programming available from the source broadcasting the television programming, such as a cable TV guide. Another example is a computer system which stores directories of folders identifying software applications available for execution. However, these directories or folders typically only store and display listings of software applications and data files that are available on that computer system or the network to which the computer system is coupled. Storing and displaying information separately for each of the multiple components in a convergent system further confuses users and makes operation of the convergent system more difficult.

Therefore, a need exists for a method and apparatus for compiling a repository of entertainment system data from multiple sources.

SUMMARY OF THE INVENTION

A method and apparatus for compiling a repository of entertainment system data from multiple sources is described herein. Entertainment system data, including television program data and software application data, is received from at least a subset of a plurality of sources. The entertainment system data is then stored in a unitary format for subsequent access by a user.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
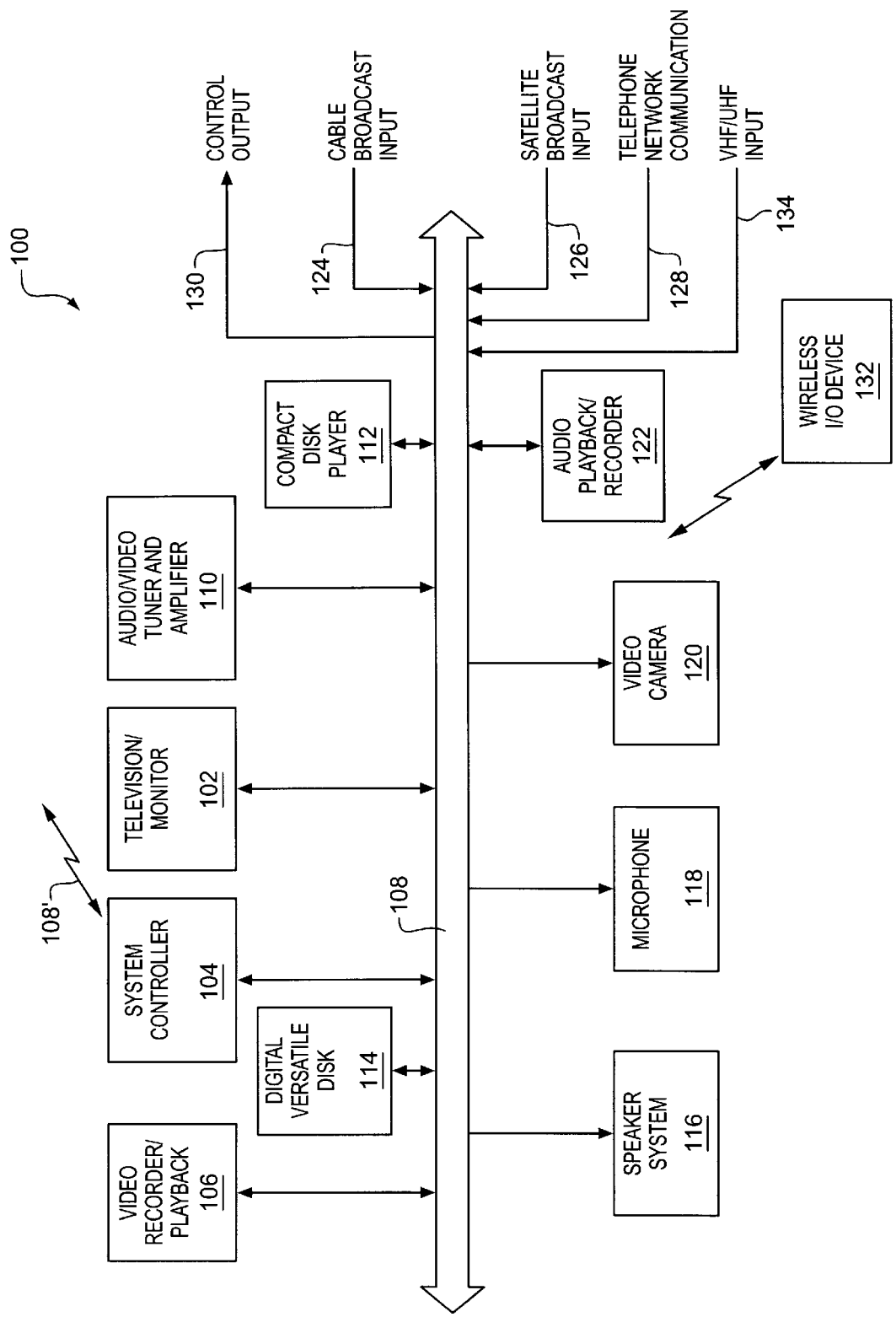
FIG. 1 is a block diagram illustrating the system components of one embodiment of an entertainment system in which the present invention may be practiced.

FIG. 1 is a block diagram illustrating the system components of one embodiment of an entertainment system in which the present invention may be practiced. As will be discussed in greater detail below, system 100 includes system controller 104 which, in one embodiment, is configured to store entertainment system data available from a wide variety of sources. System 100 may also be referred to as a "convergent system" designed to integrate the world of entertainment systems and computing platforms. In one embodiment, system controller 104 is a computer system incorporated with the teachings of the present invention, as will be discussed in further detail below. In another embodiment, system controller 104 is a "set-top" box endowed with the necessary processing power and incorporated with the teachings of the present invention.

As shown, FIG. 1 illustrates but one example of an entertainment system incorporated with the teachings of the present invention. In the illustrated embodiment, system 100 includes television/monitor 102, video recorder/playback device 106, digital video disk (DVD)[1] recorder/playback device 114, audio/video tuner and amplifier 110, audio playback/recorder device 122 and compact disc player 112, all coupled to a common input/output (I/O) bus 108. It is to be appreciated that the use of the common I/O bus 108 is for ease of explanation in the diagram only, and that a number of alternative means of routing input and output signals may be beneficially employed. For example, audio input and output could be routed with an appropriate number of independent audio "patch" cables, video signals may be routed with independent coaxial cable, and control signals may be routed along a two-wire serial line, or through infrared (IR) communication signals or radio frequency (RF) communication signals. It is also to be appreciated that video recorder/playback device 106, DVD 114, audio playback/recorder device 122, and compact disc player 112 can be single-disk or single-cassette device, or alternatively can be multiple-disk or multiple-cassette devices.

[1]DVD is currently used as an acronym for digital video disk. However, it appears that the usage is being changed to digital versatile disk to reflect the use of DVD technology for data other than video.

In addition, system 100 includes speaker system 116, microphone 118, video camera 120 and a wireless input/output (I/O) control device 132. In one embodiment, wireless I/O control device 132 is an entertainment system remote control unit which communicates with the components of system 100 through IR signals. In another embodiment, wireless I/O control device 132 may be a wireless keyboard and cursor positioning device that communicates with the components of system 100 through IR signals or RF signals. In yet another embodiment, wireless I/O control device 132 may be an I/R remote control device similar in appearance to a typical entertainment system remote control with the added feature of a track-ball, which allows a user to position a cursor on a display of system 100.

At the core of the system is system controller 104 incorporated with the features of the present invention, configured to control a wide variety of features associated with each of the system components. As depicted, system controller 104 is coupled, either directly or indirectly, to each of the system components, as necessary, through I/O bus 108. In one embodiment, in addition to or in place of I/O bus 108, system controller 104 is configured with a wireless communications transmitter (or transceiver), which is capable of communicating with the system components via IR signals or RF signals 108'. Regardless of the control medium, system controller 104 is configured to control one or more of the entertainment system components of system 100, although it is understood that each of the components may be individually controlled with wireless I/O device 132.

As illustrated in FIG. 1, system 100 can be configured to receive entertainment system data from a wide variety of sources. In one embodiment, for example, system 100 receives programming input from any or all of the following sources: cable broadcast 124 (including from the vertical blanking interval (VBI), or a separate channel), satellite broadcast 126 (e.g., via a satellite dish), very high frequency (VHF) or ultra high frequency (UHF) radio frequency communication of the broadcast networks 134 (e.g., via an aerial antenna), telephone/computer network interface 128, and/or information stored locally at system controller 104 or another component of system 100. Further, it will be appreciated by one skilled in the art, that cable broadcast input 124, satellite broadcast input 126 and VHF/UHF input 134 may beneficially receive input from digital broadcast programming and digital cable programming.

Except for the incorporated teachings of the present invention (to be more fully described below), system controller 104 is intended to represent a broad category of "computing" devices known in the art. Examples of such "computing" devices include conventional desktop computers as well as Internet "appliance" devices, such as a WebTV™ Internet Terminal available from Microsoft Corporation of Redmond, Wash., or WebTV Networks Inc. of Palo Alto, Calif. A number of audio and video input and output peripherals/interfaces for receiving, digitizing and compressing audio and video signals are also known in the art. It is to be appreciated that the housing size and design for system controller 104 may be altered, allowing it to better visually fit into system 100.

It is also to be appreciated that the several entertainment system components depicted in FIG. 1 can be beneficially combined. By way of example, system controller 104 could be integrated into television/monitor 102, DVD 114, or audio/video tuner and amplifier 110.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
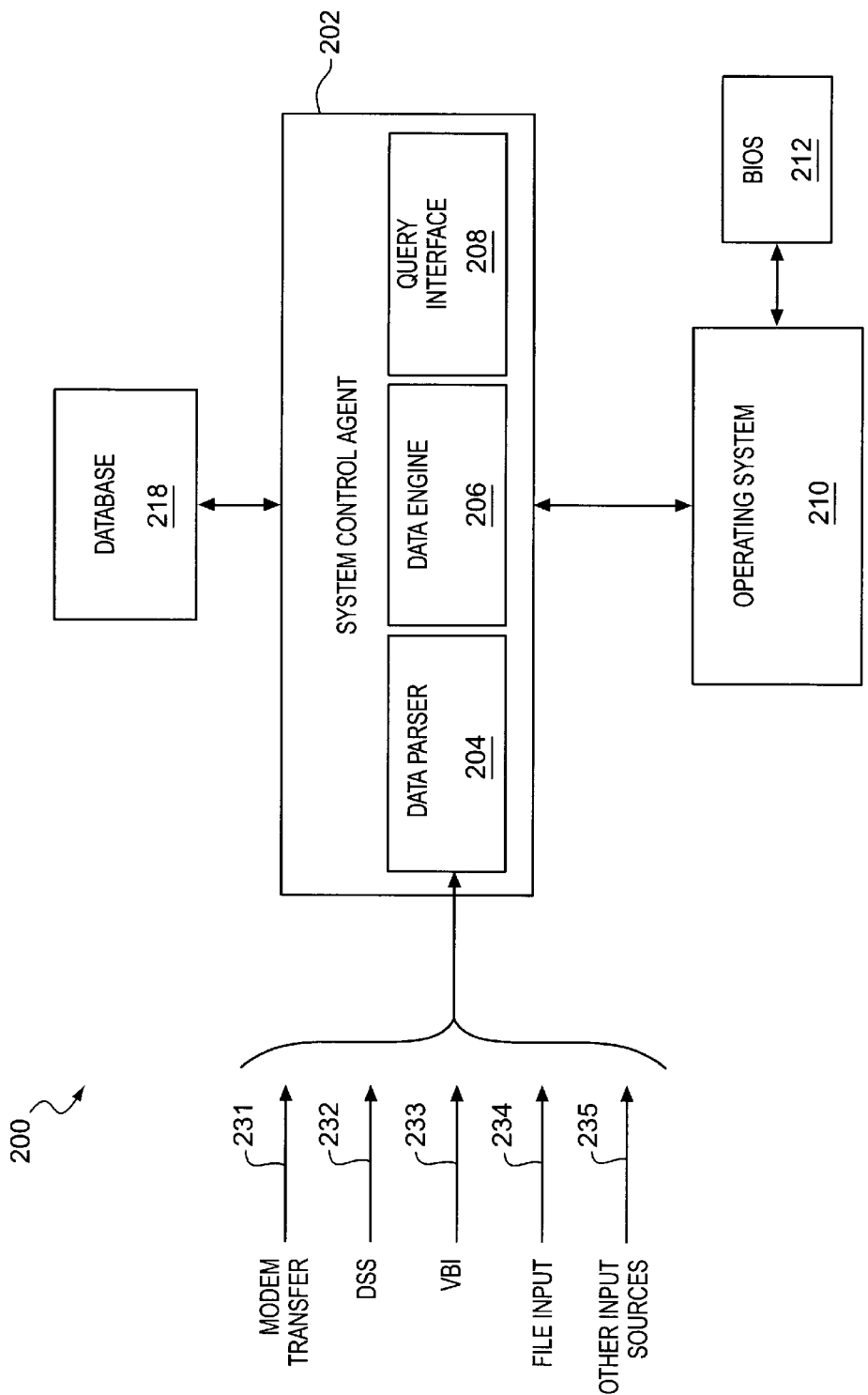
FIG. 2 is a block diagram illustrating a system architecture according to one embodiment of the present invention.

FIG. 2 is a block diagram illustrating a system architecture according to one embodiment of the present invention. System 200 includes system control agent 202, database 218, operating system 210, and basic input/output system (BIOS) 212. System control agent 202 includes data parser 204, data engine 206, and query interface 208. As illustrated, system control agent 202 receives entertainment system data from multiple sources, also referred to as "streams", including modem transfer 231, digital satellite system (DSS) 232, vertical blanking interval (VBI) 233, file input 234, as well as other input streams 235.

Entertainment system data refers to data which identifies particular programs and/or software applications or files which can be made available to users via the entertainment system. Examples of entertainment system data include television program information (including regular "broadcast" television, pay-per-view, etc.), radio station program information, "video-on-demand" program information, laser disc availability, compact disc availability, DVD availability, interactive CD-ROM availability, VHS or 8 mm tape availability, software application titles, Intercast™ broadcasts, network identifiers such as Uniform Resource Locators (URLs), etc.

BIOS 212 provides an interface between operating system 210 and the various input/output (I/O) devices coupled to system 200. Operating system 210 is a software service which provides an interface between BIOS 212 and system control agent 202 as well as other software applications, if any, being executed by system 200. Operating system 210 provides an interface, such as a graphical user interface (GUI), between the user and system 200. According to one embodiment of the present invention, operating system 210 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or the UNIX operating system, available from Santa Cruz Operations of Santa Cruz, Calif.

System control agent 202 provides the entertainment system data storage control according to one embodiment of the present invention. Internal control logic (not shown) of system control agent 202 also controls various components in the entertainment system, as discussed above.

Entertainment system data can be received by system control agent 202 from a wide range of sources. These sources include modem transfer 231, DSS 232, VBI 233, file input stream 234, as well as other input streams 235. Modem transfer source 231 provides entertainment system data obtained from remote systems via a conventional modem. In one embodiment, these remote systems are host systems accessed via a network, such as a web server accessed via the Internet, or alternatively are "dial-up" systems accessed via a plain old telephone service (POTS) or an integrated services digital network (ISDN) line. DSS source 232 provides entertainment system data obtained via a digital broadcast and a digital satellite receiver. In one embodiment, the entertainment system data is received via a separate digital channel by the DSS receiver. VBI source 233 provides entertainment system data obtained from the vertical blanking interval of a television broadcast (for example, Intercast™ broadcasts). The entertainment system data is decoded from the VBI of the television broadcast by a VBI decoder (not shown). File input stream 234 provides entertainment system data obtained from a computer file(s). The file(s) can be located locally, such as a local floppy or hard drive, or remotely, such as across a network. Other input streams 235 represent other conventional sources from which entertainment system data could be obtained. It is to be appreciated that any other conventional medium could be used to provide entertainment system data to system control agent 202, including radio frequency (RF) broadcasts, ultrasonic broadcasts, infrared (IR) broadcasts, etc.

It should be noted that entertainment system data can be obtained from any one or more of sources 231–235, and that the entertainment system data obtained from a particular source need not specify programs and/or applications which are also obtained from that same source. By way of example, television programming data could be obtained from VBI source 233, file input stream 234, or modem transfer source 231. By way of another example, software application data could be obtained from file input stream 234, or VBI source 233.

In the illustrated embodiment, entertainment system data received from each of sources 231–235 is in a different, source-specific format. Data parser 204 receives the entertainment system data from sources 231–235 in the source-specific format and translates the received entertainment system data into a "unitary format". The data in this unitary format is also referred to as "sourceless data" because it is no longer in source-specific format and, from the user's perspective, is not tied to any one particular source. In one embodiment, data parser 204 is preprogrammed with these different source-specific formats.

Data engine 206 controls access to database 218. Data engine 206 receives the entertainment system data in the unitary format from data parser 204 and stores the entertainment system data in database 218.

Database 218 provides storage for the received entertainment system data. Database 218 is also referred to as the repository for the entertainment system data. In one embodiment, database 218 is stored in a nonvolatile storage medium and loaded into system memory (RAM) when needed.

Query interface 208 provides an interface to database 218. In one embodiment, query interface 208 provides a user interface that allows a system user to actively search the entertainment system data stored in database 218. Additionally, in another embodiment, query interface is also accessible to the various components of the entertainment system. In this other embodiment, other processes or agents (not shown) within system control agent 202 or otherwise executing on system 200, as well as other components of convergent system 100 of FIG. 1 can access query interface 208 via an application programming interface (API). Thus, other processes or agents with system 100 can access and make use of database 218 via query interface 208.

Entertainment system data is received from sources 231–235 as multiple "items" or "pieces". Each item or piece of data includes various traits or information describing a particular program or application. In the illustrated embodiment, data parser 204 receives this information for each item and generates a record for each item in the unitary format which includes each of the received traits. Data parser 204 then transfers this record to data engine 206 for storage in database 218.

In the illustrated embodiment, each item received by data parser 204 includes an identifier portion and a data portion. The identifier portion provides a generic description of the item (for example, "title", "actors". "station", etc.), while the data portion provides the specific data for that item (for example, the title of the program or application described by the item, the actors in that program, the station on which that program can be seen and/or heard, etc.).

In one embodiment of the present invention, each record generated by data parser 204 includes a different field for each one of the traits for the items received from sources 231–235. It is to be appreciated that some fields will be empty, depending on whether a trait corresponding to that field was received. In an alternate embodiment, data parser generates records having only those fields with corresponding traits for a particular item.

In one embodiment, the generation of records by data parser 204 is dynamic. In this embodiment, additional fields are generated as necessary by data parser 204 to accommodate all the traits for a particular item which is received. If a new trait is received for a particular item then data parser 204 generates a new field for the record which includes that trait. In the illustrated embodiment, each trait received by data parser 204 includes an identifier portion and a data portion. Thus, if a trait is received which includes a previously unreceived identifier portion, then data parser 204 knows it has received a new trait. In one implementation, all subsequent records generated by data parser 204 also include the newly generated field. In another implementation, data parser 204 indicates to data engine 206 that a new field has been added, in response to which data engine 206 accesses each record in database 218 and adds the new field. The new field added by data engine 206 to the records in database 218 could be empty, or alternatively could be filled with a value identified by data parser 204.

In one embodiment, an indication of the source from which an item was received is also included in the record generated by data parser 204. However, in alternate embodiments an indication of the source is not necessary. In one such alternate embodiment, particular channels, stations, or file names are stored, without identifying the source from which the entertainment system data was received.

Figure 3:
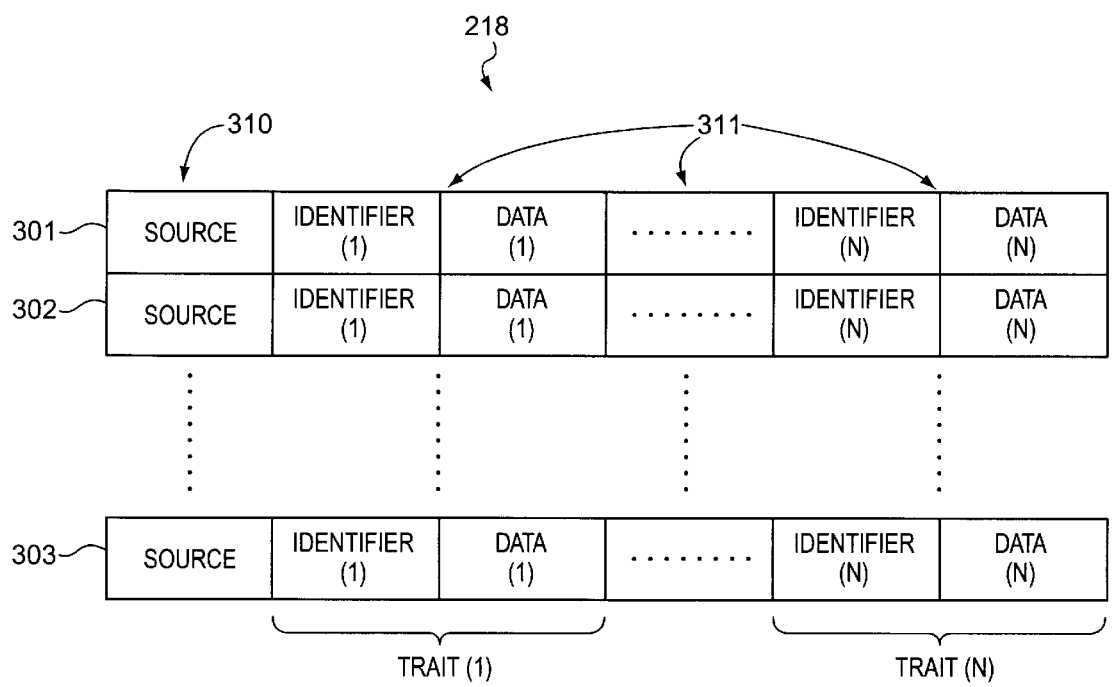
FIG. 3 illustrates entertainment system data records stored in a database according to one embodiment of the present invention.

FIG. 3 illustrates entertainment system data records stored in a database according to one embodiment of the present invention. Database 218 is illustrated including multiple records 301, 302, and 303. In one embodiment, each of the records 301, 302, and 303 includes a source identifier 310 and one or more traits 311. Source identifier 310 provides an indication of the source from which the item in the record was received. As illustrated, each one of traits 311 includes an identifier portion which identifies the type of trait and a data portion which provides the data for that trait. Traits 311 provide various information regarding the program or application and can be any of a wide range of information. Examples of such traits include title, channel, station call letters, actors/actresses/artists, duration, start time, end time, genre, critique, rating, locations of software files, parameters for executing applications, network addresses such as uniform resource locators (URLs), etc. It is to be appreciated that different numbers of traits can be stored in each record.

In one embodiment of the present invention, database 218 includes a record for each of the different entertainment options available on the entertainment system for the user. Thus, by accessing database 218, a user is able to identify the various entertainment options from which the user can currently select.

In an alternate embodiment of the present invention, each of the records 301, 302, and 303 of database 218 includes only the data portion for the traits 311. In this alternate embodiment, data engine 206 maintains information identifying the ordering of traits within the records of database 218. Thus, in this alternate embodiment data engine 206 already knows the "identifier" for a particular data portion, and thus does not need to store the identifier in database 218.

It should be noted that, in some alternate embodiments, certain options may not be available to a user even though they are included in database 218. In this embodiment, certain electronic components may not be configured to provide some of the options corresponding to items in database 218. By way of example, a cable box may not be programmed to receive certain "premium" channels. Thus, even though items in database 218 may identify particular programs, the programs cannot be displayed to the user because the cable box does not have that ability. According to another alternate embodiment, data engine 206 filters out options which are not available to the user in the entertainment system. In one implementation, data engine 206 is pre-programmed with either a list of "acceptable" or "unacceptable" channels. In this alternate embodiment, if data engine 206 receives a record from data parser 204 including a trait which identifies either an "unacceptable" channel or a channel which is not "acceptable", then data engine 206 ignores the record and does not store the record in database 218. Thus, in this alternate embodiment, only those options which are truly available to the user via the entertainment system are stored in database 218.

Figure 4:
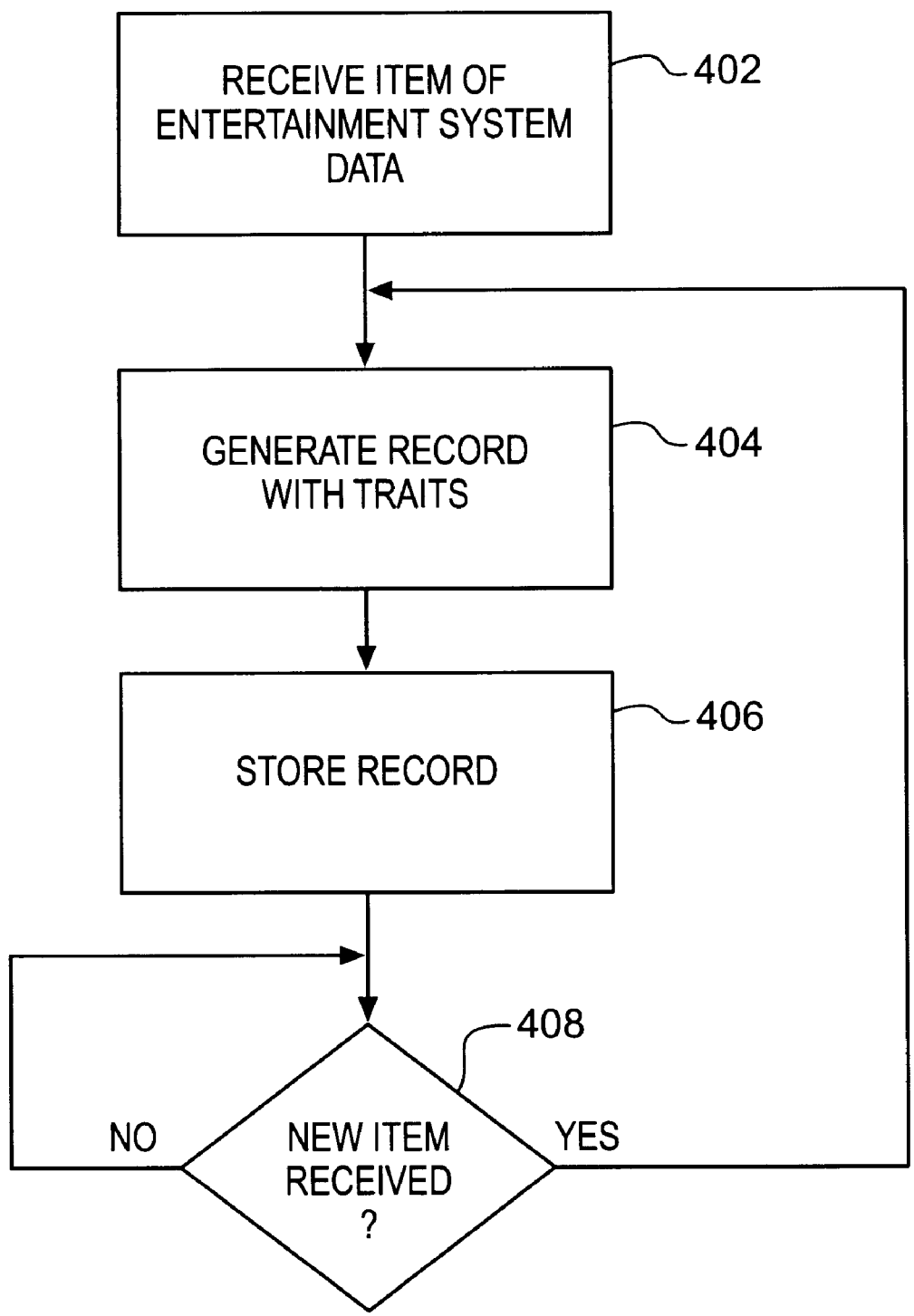
FIG. 4 is a flowchart illustrating the steps followed in generating records according to one embodiment of the present invention.

FIG. 4 is a flowchart illustrating the steps followed in generating records according to one embodiment of the present invention. Data parser 204 eventually receives an item of entertainment system data, step 402. Upon receipt of the item, data parser 204 generates a record with the traits of the item, step 404. This record is then forwarded to data engine 206 for storage in database 218, step 406. Data parser 204 waits for another item of data to be received, step 408, before returning to step 404 to generate another record.

Returning to FIG. 2, query interface 208 accesses database 218 and provides portions of database 218 for user selection. In one embodiment, query interface provides the portions by displaying them on a display device, such as a television or monitor. However, it is to be appreciated that the portions can be provided in other manners, such as audibly.

The portions of database 218 which are provided for user selection are dependent on preferences set for query interface 208. In one embodiment, query interface 208 provides a variety of user-configurable preferences which allow a user to customize the data provided via query interface 208 to his or her own choosing. In one implementation, the preferences indicate to display programs by time, such as the current time plus the next one or two hours. However, it is to be appreciated that other ordering preferences could be set, such as alphabetically, by rating, by genre, etc. The user can then scroll through the different items in any of a wide variety of conventional manners, such as using arrow buttons, a trackball, scroll bars, etc.

It is to be appreciated that certain items may not fall within the preferences selection. These items can simply not be provided as options for selection to the user, or alternatively may be grouped together at the end of a listing. By way of example, if a user has selected to display items according to program time, certain items, such as those relating to software applications, do not have particular times associated with them as they may always be available. Thus, these applications could be displayed at the end of the items being scrolled through, not displayed at all, or alternatively displayed in a different portion of the display device.

According to one embodiment of the present invention, selection of a particular item causes a corresponding action by internal control logic (not shown) of system control agent 202 to provide the user with the requested option. It is to be appreciated that the specific actions carried out by system control agent 202 are dependent on the requested item. By way of example, in response to selection of a television programming item, system control agent 202 activates the television, cable box, and/or DSS receiver, as necessary, and tunes the appropriate component to the requested channel. By way of another example, in response to selection of a software application item, system control agent 202 activates the computer system, if necessary, and sends an indication of the requested item to the computer system to enable it to execute the requested application. In the illustrated embodiment, system 200 is the computer system which will execute the requested software application. In the illustrated embodiment, system control agent 202 sends a message to operating system 210 to execute the requested application.

In one embodiment of the present invention query interface 208 is programmed with a correspondence of particular channels, stations, titles, file names, etc. to particular electronic components. By way of example, a particular channel number can be programmed to correspond to the cable box, whereas a second is programmed to correspond to the DSS receiver. In another implementation, query interface 208 is programmed with a correspondence of particular trait formats to particular electronic components. By way of example, integer numbers can be programmed to correspond to the cable box, whereas decimal numbers are programmed to correspond to an audio tuner/amplifier.

In an alternate embodiment of the present invention, the programming options corresponding to entertainment system data items are tied to the sources on which they are received by data parser 204. That is, each of the sources 231–235 corresponds to a particular electronic component. In one implementation of this alternate embodiment, each item received via DSS source 232 corresponds to the DSS receiver, each item received via VBI source 233 corresponds to a cable box, and each item received via file input 234 corresponds to system 200. Thus, in this implementation, when a particular item is selected by a user (e.g., a television program), query interface 208 can readily determine that the corresponding electronic component to be activated is the cable box and television set. Upon activating the cable box and television set, system control agent 202 can then program the cable box to the appropriate channel as identified by the traits of the selected item.

Figure 5:
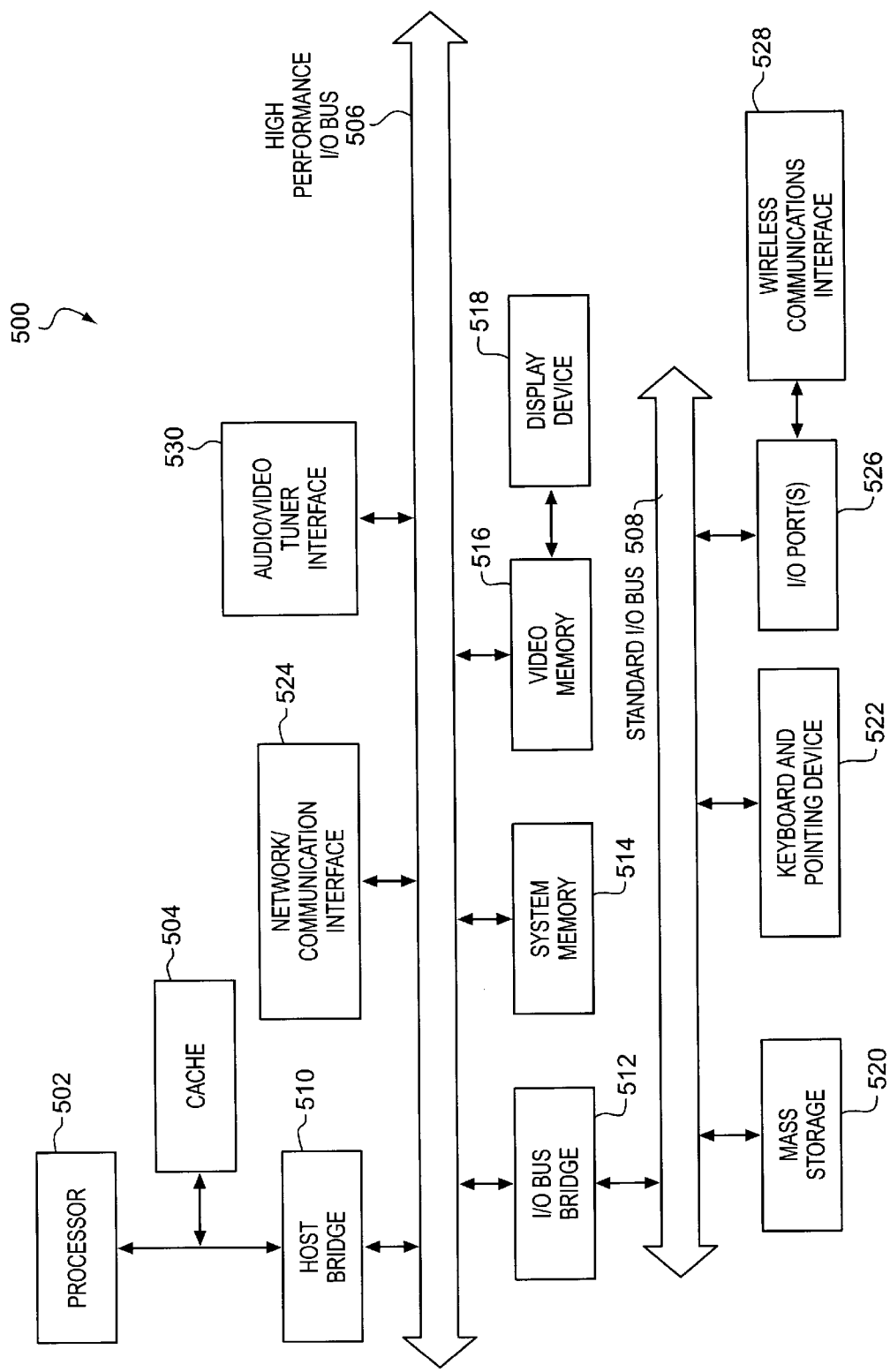
FIG. 5 is a block diagram illustrating one embodiment of a system controller incorporated with the teachings of the present invention.

Turning now to FIG. 5, a block diagram is presented illustrating one embodiment of a system controller incorporated with the teachings of the present invention. In one implementation, system controller 500 may be used as system controller 104 of FIG. 1. In the illustrated embodiment, system controller 500 includes processor 502 and cache memory 504 coupled to each other as shown. Additionally, system controller 500 includes high performance input/output (I/O) bus 506 and standard I/O bus 508, as shown. Host bridge 510 couples processor 502 to high performance I/O bus 506, whereas I/O bus bridge 512 couples high performance I/O bus 506 to standard I/O bus 508. Coupled to high performance I/O bus 506 are network/communication interface 524, system memory 514, audio/video interface board 530 and video memory 516. In turn, display device 518 is coupled to video memory 516. In one embodiment, display device 518 is television 102 of FIG. 1. Coupled to standard I/O bus 508 are mass storage device 520 keyboard and pointing device 522, and I/O ports 526. As illustrated, wireless communications interface 528 is coupled to I/O port 526. In one embodiment, wireless communications interface 528 is an IR transceiver for receiving IR signals from and sending IR signals to the components of system 100. In one embodiment, wireless communications interface 528 is an RF transceiver for receiving RF signals from and sending RF signal s to the components of system 100.

In one embodiment of the system controller 500, keyboard and pointing device are coupled to standard I/O bus 508 with a serial communication interface cable, while in alternate embodiments it may be communicatively coupled with an infrared (IR) interface or a radio-frequency (RF) interface.

With continued reference to FIG. 5, elements 502–530 perform their conventional functions as known in the art. In particular, network/communication interface 524 i s used to provide communication between system 500 and any of a wide range of conventional networks, such as Ethernet, token ring, the Internet, etc. Similarly, audio/video interface board 530 is used to receive broadcast communications from any of a wide range of conventional broadcast media such as RF broadcasts, satellite broadcasts, cable broadcasts, etc. Mass storage device 520 is used to provide permanent storage for the data and programming instructions to implement the above described functions, whereas system memory 514 is used to provide temporary storage for the data and programming instructions when executed by processor 502. I/O ports 526 are one or more serial and/or parallel communication ports used to provide communication between additional peripheral devices which may be coupled to hardware system 500.

Collectively, the elements of system controller 500 are intended to represent a broad category of hardware systems, including but not limited to general purpose computer systems based on the Pentium® processor, the Pentium® Pro processor, or the Pentium® II processor manufactured by Intel Corporation of Santa Clara, Calif., the Alpha® processor manufactured by Digital Equipment Corporation of Manard, Mass., or the PowerPC™ processor manufactured by Motorola Corporation of Schaumburg, Ill.

It is to be appreciated that various components of system controller 500 may be re-arranged. For example, cache 504 may be on-chip with processor 502. Alternatively, cache 504 and processor 502 may be packed together as a "processor module", with processor 502 being referred to as the "processor core". Furthermore, mass storage device 520, keyboard and pointing device 522, and/or display device 518 and video memory 516 may not be included in system controller 500. Additionally, the peripheral devices shown coupled to standard I/O bus 508 may, in alternate embodiments, be coupled to high performance I/O bus 506; in addition, in some implementations only a single bus may exist with the components of system controller 500 being coupled to the single bus. Furthermore, additional components may be included in system controller 500, such as additional processors, storage devices, or memories.

In one embodiment, the innovative features of the present invention discussed above, including data parser 204, data engine 206, and query interface 208 of FIG. 2 may be implemented as a series of software routines run by system controller 500 of FIG. 5. These software routines run a plurality or series of instructions to be executed by a processor, such as processor 502 in system controller 500. Initially, the series of instructions are stored on a storage device, such as mass storage device 520. It is to be appreciated that the series of instruction may be stored on any conventional storage device, such as a diskette, CD ROM, magnetic tape, DVD, laser disk, ROM, flash memory, etc. It is also to be appreciated that the series of instruction need not be stored locally, and could be received from a remote storage device, such as a server on a network, via network/communication interface 524. The instructions are copied from the storage device, such as mass storage device 520, into system memory 514 and then accessed and executed by processor 502. In one embodiment, these software routines are written in the C++ programming language. It is to be appreciated, however, that these routines may be implemented in any of a wide variety of programming languages. In alternate embodiments, the present invention may be implemented in discrete hardware or firmware. For example, an application specific integrated circuit (ASIC) could be programmed with the above described functions of the present invention.

Thus, the present invention provides a method and apparatus for compiling a repository of entertainment system data from multiple sources. The present invention advantageously allows entertainment system data from multiple sources to be combined and stored in a sourceless format. This sourceless data is then advantageously made available to the user, and possibly other system components, for review and/or selection.

Thus, a method and apparatus for a method and apparatus for compiling a repository of entertainment system data from multiple sources has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for providing an entertainment program guide comprising:

receiving entertainment system data descriptive of entertainment programs encoded in a plurality of different source formats from a plurality of different sources;

converting the received entertainment system data from each of the plurality of different sources from each of the source formats into a unitary format, the unitary format having a source identifier and at least one trait associated with each entertainment program;

storing the converted entertainment system data in the unitary format in a repository; and providing a query interface to the repository of entertainment system data in the unitary format for subsequent access by a user.

2. The method of claim 1, wherein receiving entertainment system data comprises receiving software application data and an associated network identifier.

3. The method of claim 1, wherein receiving entertainment system data comprises receiving software application data obtained from the vertical blanking interval of television broadcast data.

4. The method of claim 1 wherein the source identifier comprises an identifier of the one of the plurality of sources which corresponds to the item of entertainment system data.

5. The method of claim 1, further comprising:

receiving values for the one or more traits as part of the entertainment system data;

storing the values for each trait in a corresponding field;

for each of the one or more traits, checking whether the trait has previously been received; and generating a new field to store a trait value in the storage medium in response to the trait not previously being received.

6. The method of claim 1, further comprising:

receiving a user selection identifying an entertainment program of the entertainment system data;

determining one source from among the plurality of different sources which corresponds to the selected entertainment program using the stored source identifier for the selected entertainment program of the entertainment system data; and activating an entertainment system component corresponding to the one source of the plurality of sources to provide the selected entertainment program.

7. The method of claim 1, wherein receiving entertainment system data comprises receiving entertainment system data from a plurality of different sources selected from modem transfer, satellite antenna, radio antenna, vertical blanking intervals, the internet, and file input stream.

8. The method of claim 1, wherein the plurality of entertainment program sources are selected from radio broadcast, cable broadcast, satellite broadcast, computer network, laser disc, compact disc, DVD, CD-ROM, video tape and the internet.

9. The method of claim 1, wherein each trait has an identifier, identifying the trait and a data portion providing a value for the trait.

10. The method of claim 1, wherein the traits are selected from title, channel, duration, start time, end time, genre, rating, location of source file, network address and personal names.

11. A machine-readable medium having stored thereon a plurality of instructions, designed to be executed by a processor to facilitate data access by a user, the instructions implementing:

a function to receive a data-stream having embedded therein entertainment system data encoded in a plurality of different source formats from a plurality of different sources;

a function to convert the received entertainment system data from each of the plurality of different sources from each of the source formats into a unitary format, the unitary format having a source identifier and at least one trait associated with each entertainment program;

a function to store the entertainment system data in a unitary format; and providing a query interface to the stored entertainment system data in the unitary format for subsequent access by the user.

12. The machine-readable medium of claim 11, wherein the plurality of instructions for implementing the function to receive entertainment system data comprises a plurality of instructions for implementing a function to receive software application data and an associated network identifier.

13. The machine-readable medium of claim 11, wherein the plurality of instructions for implementing the function to receive entertainment system data comprises a plurality of instructions for implementing a function to receive entertainment system data obtained from the vertical blanking interval of television broadcast data.

14. The machine-readable medium of claim 11, wherein the plurality of instructions are further for implementing a function to receive a user selection identifying an entertainment program of the entertainment system data, a function to determine one source from among the plurality of different sources which corresponds to the selected entertainment program using the stored source identifier for the selected entertainment program of the entertainment system data, and a function to activate an entertainment system component corresponding to the one source of the plurality of sources to provide the selected entertainment program.

15. The machine-readable medium of claim 11, wherein the plurality of instructions are further for implementing:

a function to receive values for the one or more traits as part of the entertainment system data;

a function to store the values for each trait in a corresponding field;

for each of the one or more traits, a function to check whether the trait has previously been received; and a function to generate a new field to store a trait value in the storage medium in response to the trait not previously being received.

16. An apparatus comprising:

a data parser to receive a data-stream including entertainment system data encoded in a plurality of different source formats from a plurality of different sources a data engine, communicatively coupled to the data parser, to control storing of the entertainment system data in a unitary format, different from the plurality of source formats, the unitary format having a source identifier and at least one trait associated with each entertainment program, for subsequent access by a user; and a storage medium, coupled to the data parser, to store the entertainment system data.

17. The apparatus of claim 16, wherein the data parser is further operative to receive software application data and an associated network identifier.

18. The apparatus of claim 16, wherein the data parser is further operative to receive entertainment system data obtained from the vertical blanking interval of television broadcast data.

19. The apparatus of claim 16, wherein the storage medium comprises a nonvolatile storage medium.

20. The apparatus of claim 16, further comprising:

a query interface operative to receive a user selection identifying one item of the entertainment system data and to determine one source of the plurality of sources which corresponds to the one item of the entertainment system data; and control logic, coupled to the query interface, to activate an entertainment system component corresponding to the one source of the plurality of sources to provide the selected option.

21. The apparatus of claim 16, wherein the apparatus is a set-top box.

22. The apparatus of claim 16, wherein the apparatus is a computer system.

* * * * *

UNITED STATES PATENT AND TRADEMARK OFFICE
CERTIFICATE OF CORRECTION

PATENT NO. : 6,157,411
DATED : December 5, 2000
INVENTOR(S) : Williams et al.

Page 1 of 1

It is certified that error appears in the above-identified patent and that said Letters Patent is hereby corrected as shown below:

<u>Column 6,</u>
Line 26, delete "with" and insert -- within --.

Signed and Sealed this

Second Day of October, 2001

Attest:

NICHOLAS P. GODICI
Attesting Officer
Acting Director of the United States Patent and Trademark Office